(12) United States Patent
Abbasi et al.

(10) Patent No.: US 11,226,092 B2
(45) Date of Patent: Jan. 18, 2022

(54) LOW NOX COMBUSTION DEVICES AND METHODS

(71) Applicant: UTILIZATION TECHNOLOGY DEVELOPMENT, NFP, Des Plaines, IL (US)

(72) Inventors: Hamid Abbasi, Naperville, IL (US); David Cygan, Villa Park, IL (US); Sandeep Alavandi, Schaumburg, IL (US); Richard J. Kooy, Oak Brook, IL (US); David C. Kalensky, Chicago, IL (US)

(73) Assignee: UTILIZATION TECHNOLOGY DEVELOPMENT, NFP, Des Plaines, IL (US)

( * ) Notice: Subject to any disclaimer, the term of this patent is extended or adjusted under 35 U.S.C. 154(b) by 394 days.

(21) Appl. No.: 15/713,255

(22) Filed: Sep. 22, 2017

(65) Prior Publication Data

US 2018/0080647 A1 Mar. 22, 2018

Related U.S. Application Data

(60) Provisional application No. 62/397,985, filed on Sep. 22, 2016.

(51) Int. Cl.
*F23C 9/08* (2006.01)
*F23L 15/00* (2006.01)
(Continued)

(52) U.S. Cl.
CPC ............... *F23C 9/08* (2013.01); *F23D 14/08* (2013.01); *F23D 14/62* (2013.01); *F23L 15/00* (2013.01);
(Continued)

(58) Field of Classification Search
CPC .......... F23C 9/00; F23C 9/08; F23C 2202/10; F23C 2202/20; F23C 2700/04;
(Continued)

(56) References Cited

U.S. PATENT DOCUMENTS 434,492 A 8/1890 Ward
689,814 A 12/1901 Dow
(Continued)

FOREIGN PATENT DOCUMENTS

EP 0602396 A1 * 6/1994 ............... F23C 6/04

OTHER PUBLICATIONS

"Machine Translation of EP0602396A1". 2021.*
(Continued)

*Primary Examiner* — Vivek K Shirsat
(74) *Attorney, Agent, or Firm* — Pauley Erickson & Swanson

(57) ABSTRACT

Methods and combustion devices for reducing NOx formation upon combusting oxidant with fuel to form products of combustion are provided. Such methods and device may involve mixing at least first portions of at least two fluids selected from the group of oxidant, fuel and recirculated products of combustion in at least one first conduit to form a first mixture. The first mixture is subsequently supplied to a plurality of second conduits each in direct fluid communication with the first conduit. Motive energy is utilized to aspirate at least second portions of one or more fluids selected from the group of oxidant, fuel and recirculated products of combustion in at least one second conduit to form a combustible mixture that can be subsequently burned. In one embodiment, the motive energy may be provided or result from the first mixture.

22 Claims, 8 Drawing Sheets

(51) Int. Cl.
*F23D 14/08* (2006.01)
*F23D 14/62* (2006.01)

(52) U.S. Cl.
CPC ...... *F23C 2202/10* (2013.01); *F23C 2700/04* (2013.01); *F23C 2900/09002* (2013.01)

(58) Field of Classification Search
CPC ........... F23C 2900/09002; F23D 14/62; F23D 14/08; F23L 15/00
USPC ................................................ 431/9; 60/737
See application file for complete search history.

(56) References Cited

U.S. PATENT DOCUMENTS

| | | | |
|---|---|---|---|
| 3,413,069 A * | 11/1968 | Walsh | F23M 20/005 |
| | | | 431/4 |
| 3,718,426 A | 2/1973 | Harris | |
| 4,100,733 A | 7/1978 | Striebel et al. | |
| 4,130,388 A * | 12/1978 | Flanagan | F23C 7/02 |
| | | | 431/10 |
| 4,160,526 A * | 7/1979 | Flanagan | F23C 9/00 |
| | | | 239/427 |
| 4,189,294 A | 2/1980 | Rice et al. | |
| 4,378,206 A | 3/1983 | Kullendorff et al. | |
| 4,455,840 A | 6/1984 | Matt et al. | |
| 4,609,342 A | 9/1986 | Showalter | |
| 4,761,077 A | 8/1988 | Werner | |
| 4,838,295 A | 6/1989 | Smith et al. | |
| 4,845,952 A * | 7/1989 | Beebe | B01F 5/0415 |
| | | | 60/737 |
| 4,887,963 A | 12/1989 | LeMer | |
| 4,966,001 A * | 10/1990 | Beebe | B01F 5/0415 |
| | | | 60/723 |
| 4,967,561 A | 11/1990 | Brühwiler et al. | |
| 5,000,004 A * | 3/1991 | Yamanaka | F23C 13/00 |
| | | | 431/7 |
| 5,361,586 A | 11/1994 | McWhirter et al. | |
| 5,826,429 A * | 10/1998 | Beebe | F23R 3/346 |
| | | | 60/723 |
| 5,881,756 A | 3/1999 | Abbasi et al. | |
| 6,983,600 B1 * | 1/2006 | Dinu | F23R 3/40 |
| | | | 60/39.822 |
| 7,017,329 B2 * | 3/2006 | Farhangi | F23C 13/06 |
| | | | 60/39.11 |
| 7,093,438 B2 * | 8/2006 | Dinu | F23R 3/40 |
| | | | 60/737 |
| 8,943,832 B2 * | 2/2015 | Uhm | F23M 20/005 |
| | | | 60/740 |
| 9,982,885 B2 * | 5/2018 | Taylor | F23C 9/06 |
| 10,161,362 B2 * | 12/2018 | Zhang | B01F 5/0421 |
| 2002/0069645 A1 * | 6/2002 | Mowill | F23R 3/30 |
| | | | 60/776 |
| 2003/0031972 A1 * | 2/2003 | Griffin | F23C 7/002 |
| | | | 431/354 |
| 2008/0187794 A1 * | 8/2008 | Weingaertner | B01F 5/0415 |
| | | | 429/414 |
| 2010/0104990 A1 * | 4/2010 | Sarmiento-Darkin | F23D 14/22 |
| | | | 431/8 |
| 2014/0144152 A1 * | 5/2014 | Uhm | F02C 7/22 |
| | | | 60/776 |
| 2017/0114717 A1 * | 4/2017 | Martin | F01K 23/10 |

OTHER PUBLICATIONS

"Kenics HEV High Efficiency Static Mixer,"Chemineer, Bulletin 811, 2013, 2 pages.
Badr et al.,"Flame Propagation in Stratified Methane-Air Mixtures,"Journal of Fire Sciences, Nov. 1, 1984, Abstract only, 2 pages.

* cited by examiner

LOW NOX COMBUSTION DEVICES AND METHODS

CROSS REFERENCE TO RELATED APPLICATION(S)

This application claims the benefit of U.S. Provisional Patent Application, Ser. No. 62/397,985, filed on 22 Sep. 2016. The Provisional Patent Application is hereby incorporated by reference herein in its entirety and is made a part hereof, including but not limited to those portions which specifically appear hereinafter.

BACKGROUND OF THE INVENTION

Field of the Invention

This invention relates generally to combustion processes and, more particularly, to devices and methods that combust oxidant and fuel in a burner to provide or result in low or reduced levels of NOx formation such as through the proper recirculating and mixing products of at least partial combustion with fuel and/or oxidant.

Description of Related Art

The use of converging-diverging nozzles to draw a first fluid into a second fluid to form a mixture is known. The use of recirculated cooled products of combustion to reduce flame temperature and NOx formation is also known.

A number of technologies exist, such as disclosed in U.S. Pat. Nos. 5,350,293; 6,663,380; and 6,672,859, for example, wherein partially cooled products of partial combustion are recirculated into the root of the flame(s) of the burner to improve temperature and composition uniformity for NOx reduction. While the recirculated gases mix with the flame near its periphery, these gases are not able to mix well with the central portion of the flame(s), especially in larger burners or combustion devices. Since the flames are generally hottest in a zone proximate their axis, this lack of penetration and mixing of recirculated gases into the middle of the flame prevents effective reductions in peak flame temperatures and NOx formation.

SUMMARY OF THE INVENTION

As detailed further below, in accordance with one embodiment a two stage mixing approach with multiple secondary mixing conduits is utilized to improve the mixing of oxidant, combustibles and cooled combustion products prior to combustion. The use of multiple secondary mixing conduits helps aspirate generally an amount of fluid that is proportional to the flow rate of the motive gas flowing through individual secondary mixing conduits. The use of multiple aspirating secondary conduits therefore can be helpful in distributing the oxidant, combustibles and recirculated gases uniformly through the conduits and helps mixing these gases well prior to combustion. The use of multiple secondary mixing conduits can also reduce the required length for uniform secondary mixing. The uniform flow and composition profile of gases across these conduits and the enhanced mixing of these gas mixtures within these conduits can desirably lead to one or more of improved flame temperature, composition uniformity, reduced peak flame temperatures and peak oxygen concentrations, even in the middle of the flames proximate its axis, which conventional systems are unable to do effectively, thereby reducing NOx formation and improving combustion efficiency. Further, the use of a venturi-type design for at least one of primary and secondary mixing conduits allows pressure drop recovery and minimizes overall pressure drop for effective mixing. The use of multiple secondary mixing conduits also increases the amount of surfaces that can remove heat to minimize potential for flame flashback into these conduits.

The subject development is suitable for use in combusting a variety of combustible gases and oxidants and mixtures thereof in a variety of applications, including, for example, in or with residential, commercial, or industrial power generation equipment. The concept is especially suitable in applications requiring low NOx emissions.

In one aspect of the subject development, a method for reducing NOx formation upon combusting oxidant with fuel to form products of combustion is provided. In one embodiment, such a method involves mixing at least first portions of at least two fluids selected from the group of oxidant, fuel and recirculated products of combustion in at least one first conduit to form a first mixture. The first mixture is subsequently supplied to a plurality of second conduits each in direct fluid communication with the first conduit. Motive energy in the first mixture is utilized to aspirate at least second portions of one or more fluids selected from the group of oxidant, fuel and recirculated products of combustion in at least one second conduit to form a combustible mixture that can be subsequently burned.

In one embodiment, the motive energy is provided, supplied, or results from or in the first mixture.

In one embodiment, the mixing step may suitably involve aspirating, via motive energy in at least the first portion of a first of the at least two selected fluids the first portion of a second of the at least two selected fluids.

In another aspect of the subject development, there is provided a combustion device such as to produce or result in combustion of oxidant and fuel with reduced NOx formation. In accordance with one embodiment, such a combustion device includes a burner for combusting oxidant with fuel to form products of combustion. The device also includes at least one first conduit wherein at least first portions of at least two fluids selected from the group of oxidant, fuel and recirculated products of combustion are mixed to form a first mixture. The device further includes a plurality of second conduits each in direct fluid communication with the first conduit and in fluid discharge communication with the burner. In the second conduits motive energy aspirates at least second portions of one or more fluids selected from the group of oxidant, fuel and recirculated products of combustion to form a combustible mixture.

In one embodiment, the motive energy is provided, supplied, or results from or in the first mixture.

In accordance with at least some preferred embodiments, combustion devices include or incorporate portions or regions whereat or wherein motive energy is utilized or employed to aspirate and mix two or more different materials together.

BRIEF DESCRIPTION OF THE DRAWINGS

Objects and features of this invention will be better understood from the following description taken in conjunction with the drawings, wherein.

DETAILED DESCRIPTION

A process and apparatus for recirculating and mixing products of partial combustion with fuel and/or oxidant is described. The proposed approach will provide improved mixing of fuel, oxidant and recirculated products of partial combustion, thereby improving uniformity and reducing peak levels of temperature and oxygen concentration within the flame for reduced NOx formation while maintaining stable combustion. The impacts of flame temperatures and flame oxygen levels on NOx formation are well known.

Figure 1:
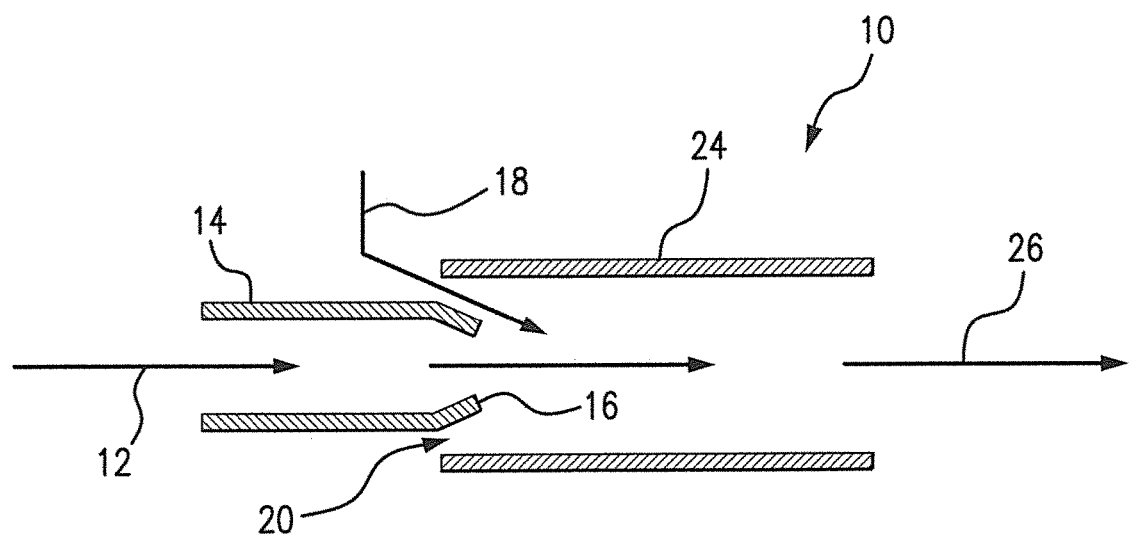
FIG. 1 is a simplified schematic showing fluid ejector principles in accordance with one aspect of the subject development.

In accordance with one preferred aspect of the subject development, the basic principle of using the kinetic energy in one fluid to aspirate and mix in another fluid is purposefully utilized. FIG. 1 is an illustration, showing a fluid ejector assembly generally designated by the reference numeral 10, used to describe this principle. In the fluid ejector assembly 10, a first fluid (represented by the arrow 12), termed motive fluid, enters a conduit 14. The conduit 14 has or includes a narrowed or restricted throat or exit portion 16. As the cross section of the conduit 14 decreases or narrows at the throat or exit 16, the pressure energy of the motive fluid converts to velocity energy which creates a low pressure zone at the throat or exit to draw in and entrain a second fluid, represented by the arrow 18, and sometimes referred to as a suction fluid. The suction fluid 18 can be drawn through opening(s) 20 around the conduit 14 or its exit or throat 16 and can mix with the motive fluid 12 stream in the conduit 24 to form a mixture, represented by the arrow 26 and such as shown as exiting the conduit 24. In accordance with one embodiment, the suction fluid 18 is effectively aspirated, via motive energy of the motive fluid 12.

Figure 2:
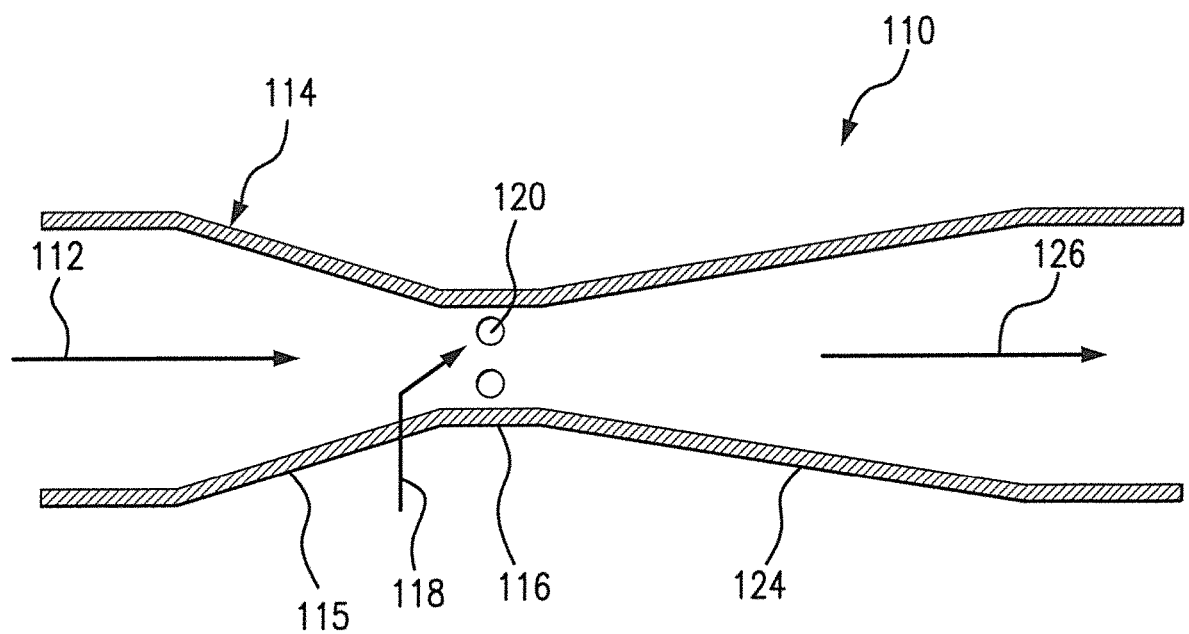
FIG. 2 is a simplified schematic of a converging-diverging ejector in accordance with one aspect of the subject development.

FIG. 2 illustrates an injector assembly, generally designated by the reference numeral 110, in accordance with another embodiment. As further detailed below, the injector assembly 110 desirably utilizes or employs at least one converging-diverging conduit 114. A first or motive fluid, represented by the arrow 112, enters a converging section 115 of the conduit 114. As the cross section of the conduit 114 decreases or narrows, e.g., converges, at or to a throat portion 116, the pressure energy of the motive fluid converts to velocity energy which creates a low pressure zone at the throat 116 to draw in and entrain a suction fluid, represented by the arrow 118, through opening(s) 120 and mix with the motive fluid stream in a diverging section 124 of the conduit 114 to form a mixture, represented by the arrow 126 and such as shown as exiting the diverging section 124 of the conduit 114. In accordance with one embodiment, the suction fluid 118 is effectively aspirated, via motive energy of the motive fluid 112.

As will be appreciated by those skilled in the art and guided by the teachings herein provided, a wide range of basic design approaches for using the kinetic energy in one fluid to aspirate and mix in another fluid are known and can be selected and utilized in implementing the subject development depending on the properties, conditions and desired flow rates of the motive and the suction fluid(s) as well as the desired characteristics and conditions of the resulting mixture.

Figure 3:
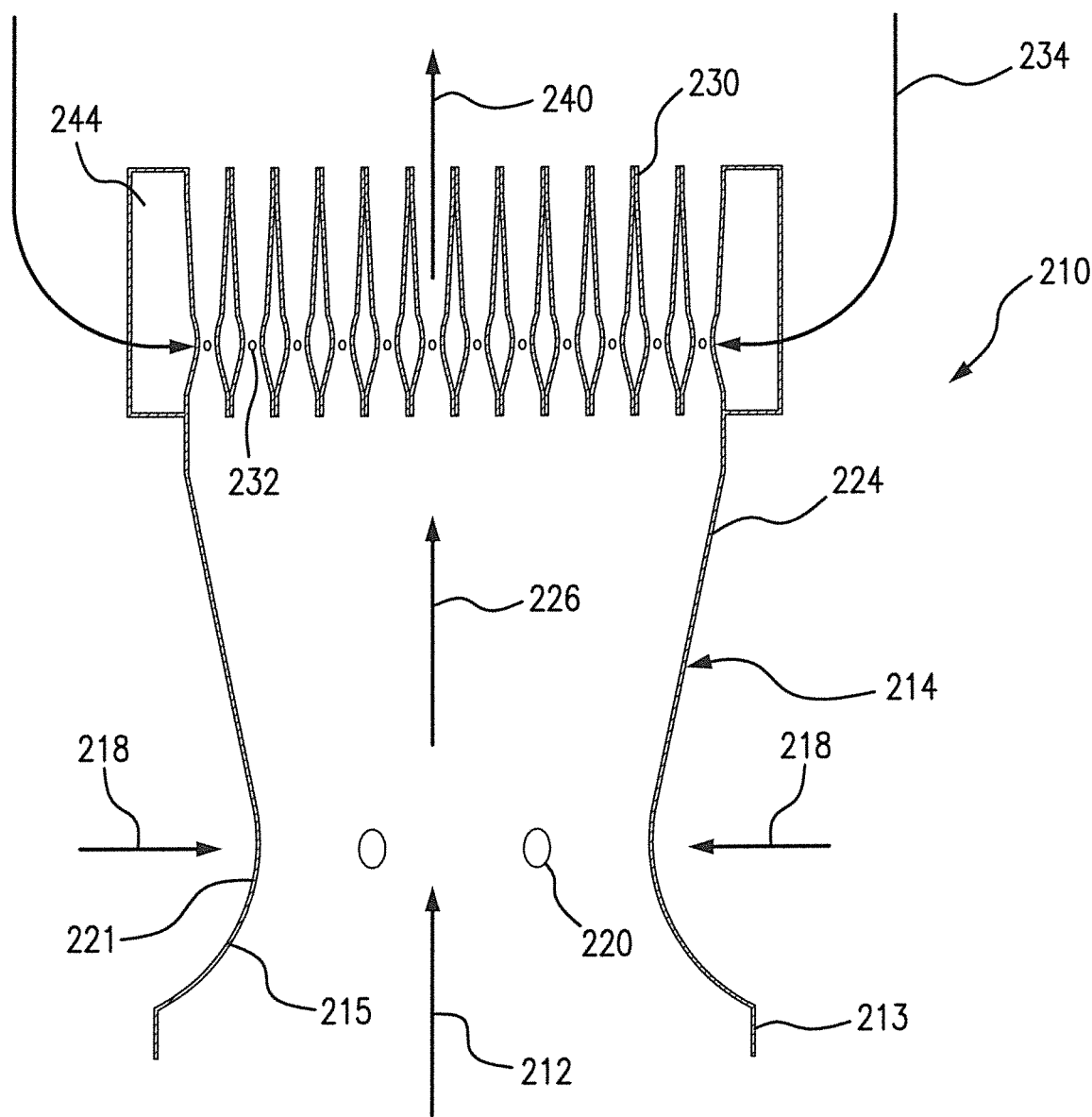
FIG. 3 is a simplified schematic of a combustion device in accordance with one aspect of the subject development.

FIG. 3 illustrates an embodiment of the subject development for improved mixing of fuel, oxidant and recirculated products of partial combustion using converging-diverging conduits. As detailed below, the use of converging-diverging conduits improves mixing of fluids and reduces pressure drop.

Those skilled in the art and guided by the teachings herein provided will understand and appreciate that while the following embodiment is described using converging-diverging conduits, other types or forms of aspirating approaches can also be used effectively.

Turning to FIG. 3, there is shown a combustion device, generally designated by the reference numeral 210, in accordance with one embodiment of the subject development. A first fluid (e.g., Fluid A), represented by the arrow 212, enters a converging-diverging conduit 214 at an inlet 213. As detailed below, the conduit 214 acts as or forms a primary conduit that forms or serves as a mixer.

As the first fluid moves through a converging section 215 of the conduit 214, its velocity increases and pressure decreases. The decrease in pressure draws a second fluid, represented by the arrow 218 (e.g., Fluid B), through at least one opening 220, preferably located proximate the smallest cross section plane 221 of the converging section 215. A mixture of the first and second fluids, such a mixture represented by the arrow 226 goes through a diverging section 224 of the conduit 214 where its pressure is at least partially recovered to minimize pressure drop losses. The fluid mixture 226 then enters a second set of converging-diverging conduits 230 such as are, for example, substantially oriented parallel to each other. The secondary conduits 230 may be identical to each other or different in one or more of parameters including: length, cross section, shape and the size, shape, orientation and number of holes 232 to achieve desired downstream results. The holes can be of a variety of shapes including annular, continuous, or discontinuous slot(s) such as shown in FIG. 1. The secondary conduits 230 are designed preferably to aspirate a third fluid (e.g., Fluid C), such as represented by the arrows 234, generally in proportion to the amount of mixture 226 flowing through the secondary conduits. This promotes creation of a uniform mixture 240 of the first, second and third fluids, e.g., Fluids A, B and C, at the exit of the secondary conduits. Further, the use of multiple secondary conduits also improves uniformity of the velocity profile of the exiting mixture. The third fluid 234 may suitably enter the secondary conduits 230 in any appropriate desired manner, such as through at least one opening in a plenum 244. The mixture 240, in accordance with one preferred aspect of the development, preferably contains at least one combustible component and one oxidant to form a combustible mixture and is burned downstream of the conduits 230 to form a flame. In one preferred embodiment, the first fluid (e.g., Fluid A) and the second fluid (e.g. Fluid B) are each a gas or a mixture of gases containing at least one of an oxidant and a combustible material such that the mixture 226 of the first and second fluids contains both an oxidant and a combustible material. The third fluid (e.g., Fluid C) in accordance with one embodiment, is a partially cooled product of at least partial combustion of gases resulting from combustion of the combustible material in at least one of first and second fluids (e.g., the Fluids A and B). In one embodiment, the recirculation of the third fluid (e.g., Fluid C) reduces flame temperature and NOx formation. In one embodiment, the conduits 230 are designed to achieve sufficient fluid velocities and heat dissipation to avoid potential for flashback. In one embodiment, one or more of the conduits 230 can be coated with high temperature material to improve component life.

Figure 4:
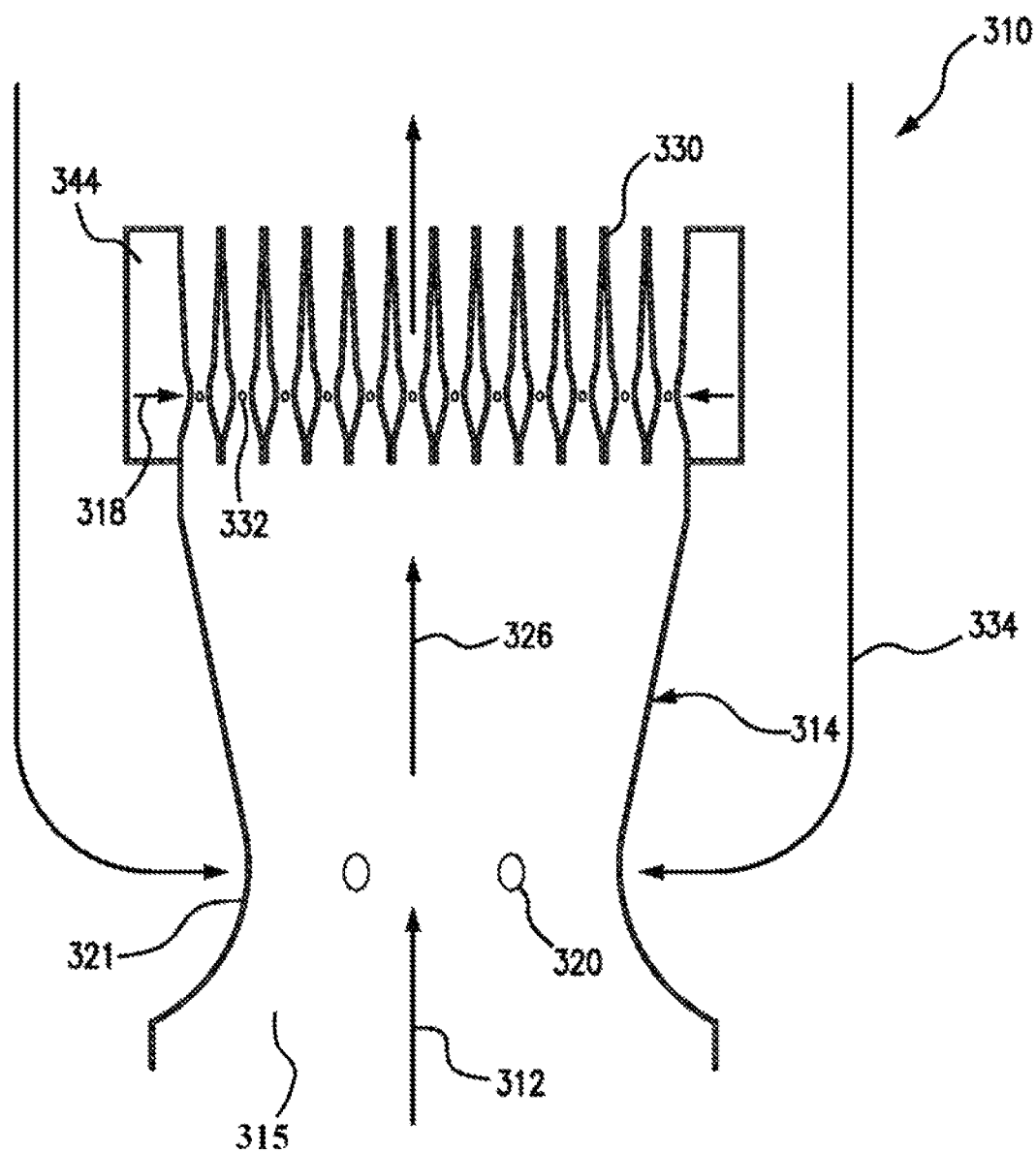
FIG. 4 is a simplified schematic of a combustion device in accordance with another aspect of the subject development.

FIG. 4 illustrates an embodiment of a subject combustion device, here designated by the reference numeral 310, in which the fluid (e.g., Fluid C) represented by the arrows 334 is drawn into a first fluid (e.g., Fluid A) represented by the arrow 312 through one or more openings 320, preferably located proximate the smallest cross section plane 321 of the converging section 315, to form a mixture of the Fluids A and C, represented by the arrow 326, and the Fluid B, represented by the arrows 318 is drawn in through openings 332 in the secondary conduits 330 in the plenum 344. By maintaining the concentration of combustibles in the mixture 326 below the combustible limit, and only increasing it to within the combustible limit by introduction of the Fluid B through the openings 332, the potential for flashback to a zone upstream of the openings 332 is avoided. In one embodiment, the conduits 330 are designed to achieve sufficient fluid velocities and heat dissipation to avoid potential for flashback within conduits 330.

Figure 5:
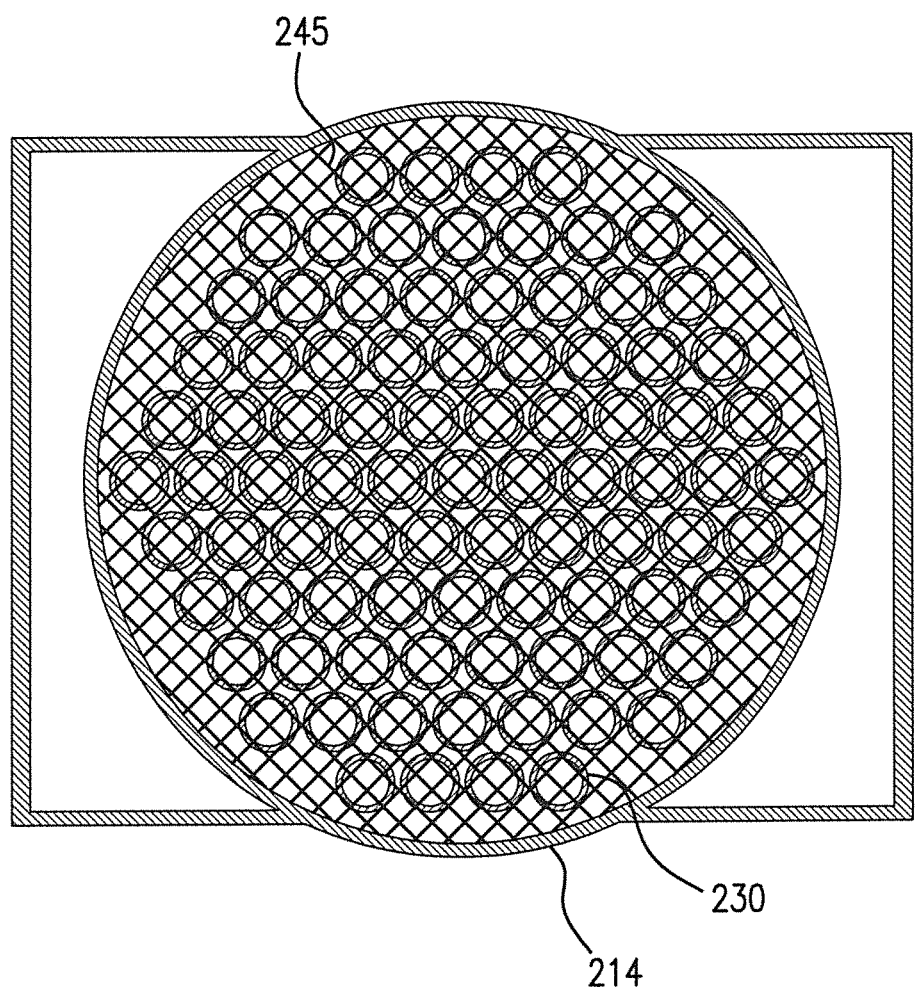
FIG. 5 is a top view of a combustion device in accordance with one aspect of the subject development.

FIG. 5 illustrates a top view of the combustion device illustrated in FIG. 3. Whereas the illustration shows round cross sectional conduits 214 and 230, these conduits can be of many other cross sectional shapes, such as oval, square, or rectangular, for example, as well as of varying cross sectional shape along their length to achieve desired results. Whereas the space between the conduits 230 is sealed with a membrane proximate their entrance, the space between the conduits 230 proximate their exit may or may not be sealed. The conduits can be made of different thicknesses to act as a flame stability mechanism. The space between conduits 230 can vary from no space to more than one conduit diameter space uniformly or non-uniformly to achieve desired results.

This top view also shows the inclusion of a screen mesh 245 such as disposed downstream and proximate the plurality of secondary conduits 230. The inclusion or presence of such a screen mesh or the like may be desired such as to assist to stabilize combustion and/or increase radiation. Further, the screen mesh or the like may be coated with or otherwise contain or include a catalyst, as may be desired for a particular application such as a catalyst to promote combustion reactions, for example.

As will be appreciated, the view shown in FIG. 5 can alternatively be applied to the combustion device 310 shown in FIG. 4 and wherein the illustrated conduits are conduits 314 and 330, rather than conduits 214 and 230.

Figure 6:
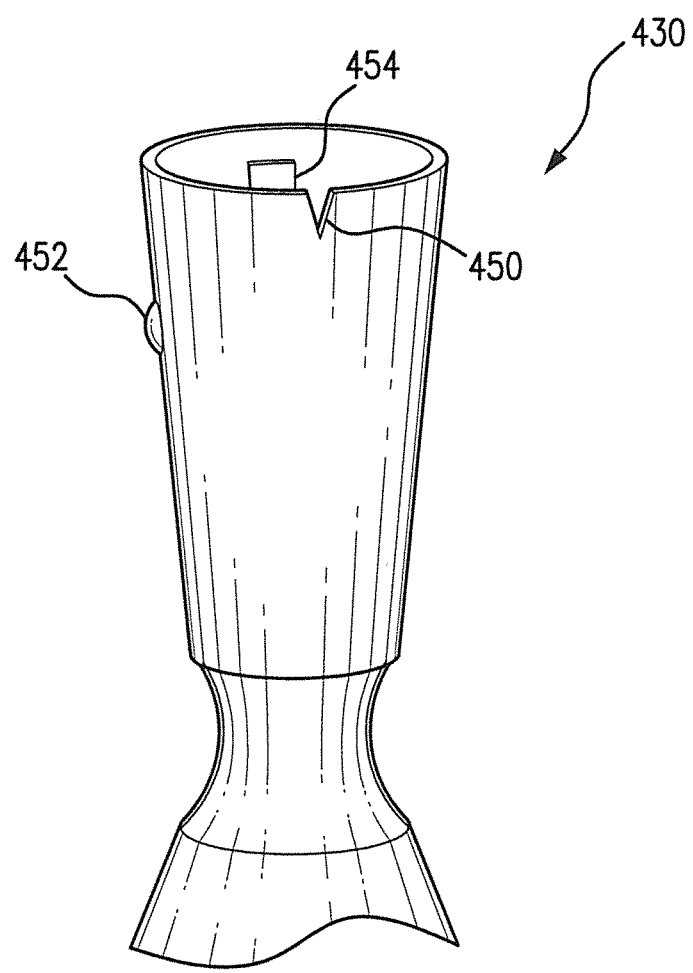
FIG. 6 is a perspective view showing a conduit with exit modifications in accordance with one aspect of the subject development.

FIG. 6 illustrates a secondary conduit 430 that incorporates several exit modifications in accordance with one aspect of the subject development. More specifically, the secondary conduit 430 includes or incorporates at least one notch 450 or the like, at least one depression, dimple or the like 452, and at least one projection or the like 454 such that the exit surface of the secondary conduit 430 is made rough or non-uniform such as to perturb the exiting flow stream and such as can promote formation of recirculating eddies such as to improve flame stability.

Figure 7:
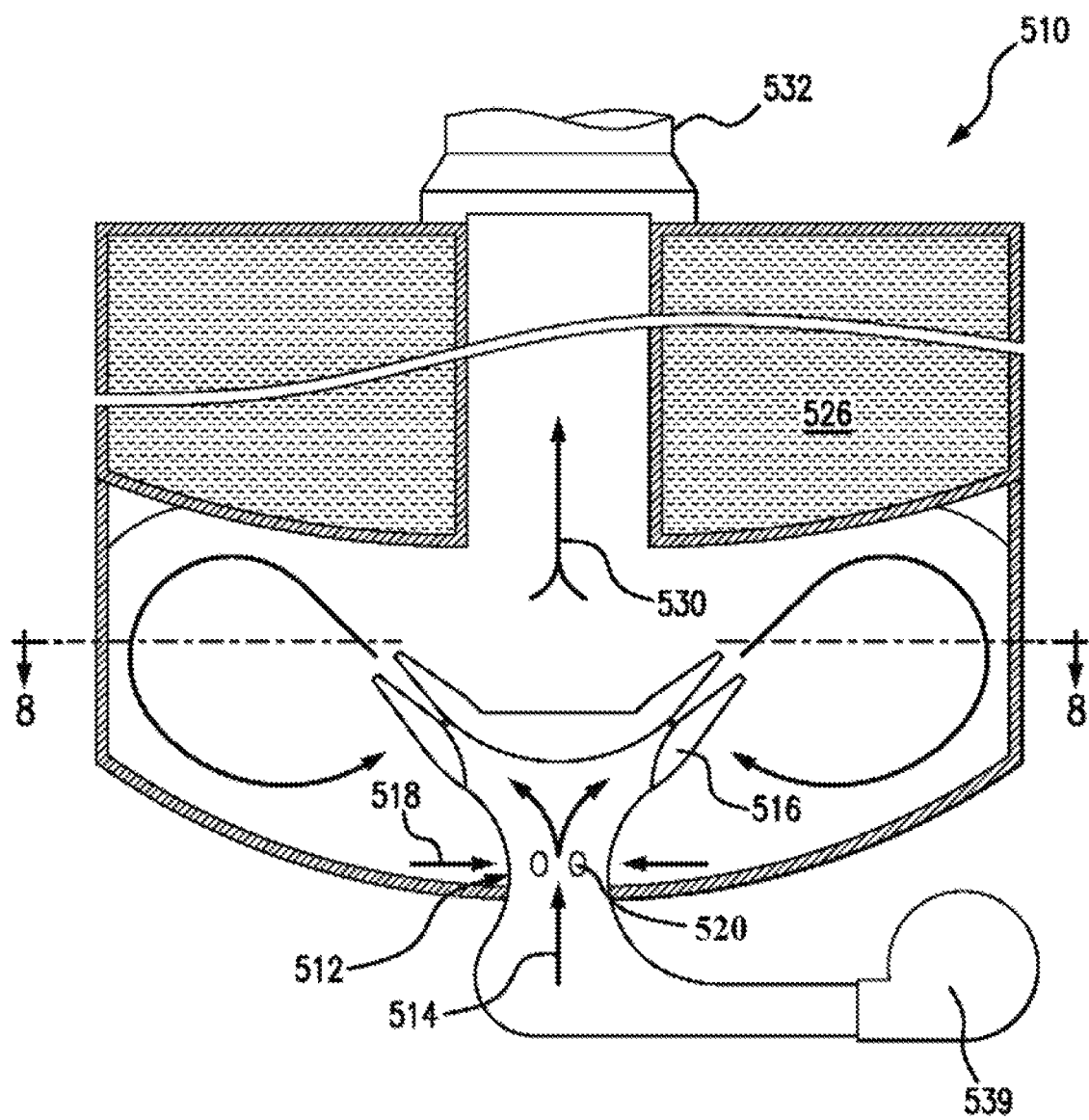
FIG. 7 is a side sectional view of a water heater assembly incorporating a burner assembly or device in accordance with one aspect of the subject development.
Figure 8:
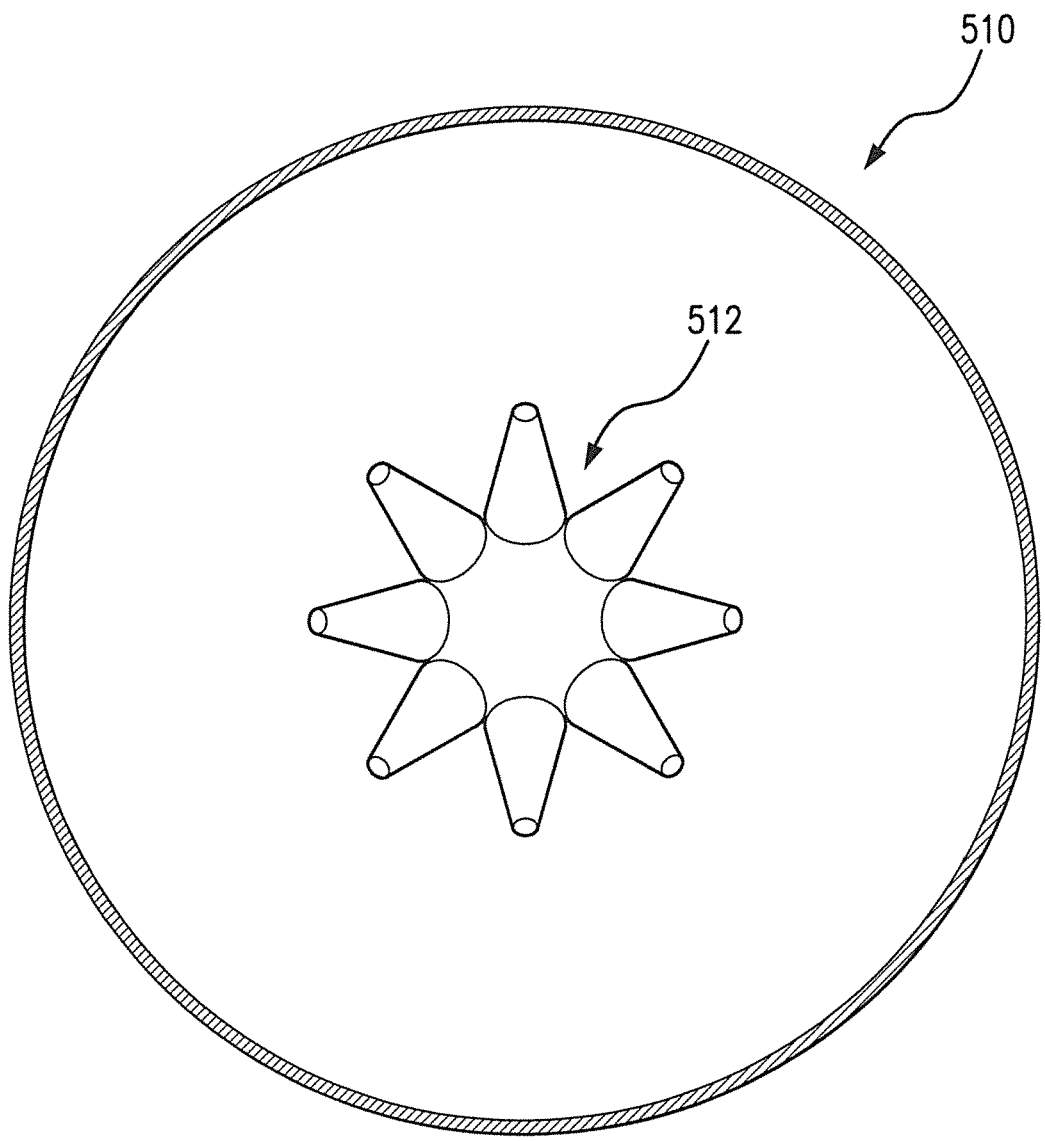
FIG. 8 is a sectional view taken along the line 8-8 of the water heater assembly shown in FIG. 7.

FIG. 7 and FIG. 8 illustrate a water heater assembly 510 incorporating a burner assembly or device 512 in accordance with one aspect of the subject development. In the water heater assembly 510, in one embodiment of the invention, Fluid A is represented by the arrow 514, Fluid B is shown in the plenum 516 and Fluid C is represented by the arrows 518, entering the burner assembly through the openings 520.

The water heater assembly 510 is effective to heat a supply of water, generally designated as 526. The burner assembly produces or forms combustion exhaust such as represented by the arrow 530 that can be appropriately vented through an outlet 532.

As shown in the water heater assembly 510, the burner device 512 can, if desired, be supplied with or via a motive force supplied or resulting from application of an incorporated fan device 539 or the like.

Furthermore, as the conduits of the burner device 512 are radially distributed or disposed such an embodiment illustrates that the conduits of burner assemblies in accordance to the subject development are not necessarily required to be either parallel or straight and the broader practice of the subject development is not necessarily so limited.

Those skilled in the art and guided by the teachings herein provided will further understand and appreciate that the above-described embodiments can be suitably modified or altered for particular applications.

The ratio of oxidant used to oxidant needed for complete combustion can desirably be between 0.4 to 20, preferably between 0.7 to 1.7 and more preferably between 1 and 1.5.

The ratio of the amount of recirculated products of partial combustion to total products of combustion can desirably be between 0.05 to 2, preferably between 0.1 to 1, and more preferably between 0.2 to 0.5.

The ratio of the number of secondary conduits to the number of primary conduits can desirably be from 2 to 200, preferably from 3 to 60, more preferably from 3 to 20 and even more preferably from 5 to 10.

The number of primary conduits can desirably be from 1 to 20 and, in some embodiments from 1 to 10, preferably from 1 to 6 and more preferably from 1 to 3.

In an embodiment, one or more of the conduits is or are replaced with at least 2 substantially parallel oriented and substantially similar conduits.

In another embodiment, the conduit 214 in FIG. 3 is replaced with a non-divergent conduit without openings 220 and supplied by a mixture of the Fluids A and B.

In another embodiment, the conduit 314 in FIG. 4 is replaced with a non-divergent conduit without openings 320 and supplied with the Fluid A.

In another embodiment, the diverging section in at least one of the converging-diverging conduits is replaced by a straight conduit section.

In another embodiment, a continuous or segmented annular opening is used proximate the tip of the converging section in at least one of the secondary converging-diverging conduits to draw in the Fluid B and Fluid C, respectively.

In another embodiment, at least a portion of the Fluid C is drawn through openings in one or more of the primary conduits.

In another embodiment, at least a portion of the Fluid B is drawn through openings in the plenum.

In another embodiment, two or more of the mixers can be arranged to form a larger capacity mixer for fuel, oxidant and at least partially cooled products of at least partial combustion.

In one embodiment, at least one of the Fluids A and B could be preheated.

Increasing the number of secondary conduits may and desirably will improve the uniformity of the mixture across the secondary conduits such as to improve one or more of uniformity of temperature and oxidant concentration within the combustion zone downstream of the secondary conduits for NOx reduction.

Increasing the number of secondary conduits may and desirably will improve at least one or more of uniformity of mixing and stability and reduce peak temperatures within the combustion zone downstream of the secondary conduits for at least one of enhanced turndown and lower emissions of NOx and unburned combustibles.

The mixer concept described can be used as a component to introduce a mixture of the Fluids A, B and C in a more complex combustion device.

In one preferred embodiment, at least one of the Fluid A and the Fluid B contains a mixture of oxygen and mostly inert gases such as nitrogen, moisture and carbon dioxide.

In one preferred embodiment, at least one of the Fluid A and the Fluid B contains a mixture of combustible gases and mostly inert gases such as nitrogen, moisture and carbon dioxide.

In one preferred embodiment, at least one of the Fluid A and the Fluid B is air.

In one preferred embodiment, at least one of the Fluid A and the Fluid B is a gaseous hydrocarbon fuel.

In one preferred embodiment, at least one of the Fluid A and the Fluid B is natural gas.

In a preferred embodiment, the number of secondary conduits is at least 3.

In a preferred embodiment, the number of secondary conduits is at least 7.

In a preferred embodiment, the number of secondary conduits is at least 14.

In one embodiment, the secondary conduits are supplied with at least one of an oxidant and combustible gas and additionally one of an oxidant and combustible gas is supplied through the holes or openings to form a combustible mixture in the secondary conduits which collectively form a radiant permeable or porous membrane combustion device. Alternatively, a premixed mixture of an oxidant and a combustible may be supplied directly to the secondary conduits. This type of device can be used as an infrared radiant burner that typically uses metal, ceramic or composite permeable membranes. These include ported, porous perforated, foam or fiber mesh ceramic, refractory, metallic, composite, or sintered metal radiant devices with or without surface coatings.

The use of secondary mixing conduits increases pressure drop and adds complexity to the design. There is also potential for combustion to initiate within the secondary mixing conduits requiring the use of more expensive materials.

In one embodiment of the invention, the inside of at least one secondary conduit is embedded or coated with a catalyst to initiate a reaction between the combustible and the oxidation components in the fluid mixture.

In one embodiment of the invention, the exit surface of at least one of the secondary conduits is made rough or non-uniform to perturb the exiting flow stream and promote formation of recirculating eddies to improve flame stability by incorporating at least one of at least one notch, depression or projection or a continuous depression or projection or a sudden shape change.

In another embodiment, a metallic, ceramic or composite screen or mesh is placed downstream and proximate the secondary conduits to stabilize combustion and increase radiation. The screen or mesh can be with or without a catalyst, as may be desired for a particular application.

In another embodiment, the screen or mesh is embedded or coated with a catalyst to promote combustion reactions.

In some preferred embodiments, the velocity of mixtures at the exits of first and second conduits in devices and methods of the subject development are desirably at least 1 ft/s and are desirably no more than about 500 ft/s. In some preferred embodiments, the velocity of mixtures at the exits of first and second conduits in devices and methods of the subject development are desirably at least 10 ft/s and are desirably no more than about 250 ft/s.

The opening(s) in secondary conduits can be of a wide range of shapes, including round, oval, rectangular, square, elliptical, star, slot, annular, etc., for example.

The proposed mixing and combustion technology reduces NOx formation such as by uniformly mixing and distributing fuel and oxidant, with and without recirculated partially cooled products of combustion across the flame cross section to improve uniformity of flame temperatures and oxygen concentrations across the flame front that promote a reduction in NOx formation.

The use of multiple secondary conduits also reduces the secondary zone mixing length and increases heat dissipation because of increased conduit surface area to reduce potential for flashback.

While the use of converging-diverging nozzles to draw a Fluid A into a Fluid B to form a mixture is known and the use of recirculated cooled products of combustion to reduce flame temperature and NOx formation is also known, the use of multiple small converging-diverging or alternate type mixing conduits to uniformly mix fuel, oxidant and recirculated partially cooled products of combustion in a short distance and uniformly distribute the mixture across the combustion device exit for stable combustion with low NOx formation is not known.

The use of secondary mixing conduits may increase pressure drop and add complexity to the design. There is also potential for combustion to initiate within the secondary mixing conduits requiring the use of more expensive materials.

While combustion devices in accordance with the subject development are not necessarily limited by or to specific manufacturing techniques, in one embodiment, application of Additive Manufacturing (AM) methods or techniques are believed to be particularly conducive or desirable to the manufacture of combustion devices in accordance with the subject development. As will be appreciated, suitable such additive manufacturing methods typically may involve technologies and equipment such as used to make 3D objects such as by repetitively adding (i.e. depositing) layer-upon-layer of material until the object achieves the shape defined by a pre-determined computer-aided design (CAD) model. Materials deposited during additive manufacturing processes may include plastic resin, concrete or metal, the latter material being used in one preferred embodiment of the subject low NOx combustion device. Currently, there are four primary metal additive manufacturing processes: Powder Bed Fusion (PBF), Binder Jetting (BJ), Direct Energy Deposition (DED), and Sheet Lamination. PBF is most commonly used for metal printing and involves laser sintering or melting or electron beam melting with each having its benefits and limitations. Binder Jetting works by depositing binder on metal powder, curing the binder to hold the powder together, sintering or consolidating the bound powder, and (optionally) infiltrating it with a second metal. Sheet Lamination uses laminate object manufacturing. Sheet Lamination uses stacking of precision cut metal sheets to form a 3D object. After stacking, these sheets are either adhesively joined or metallurgically bonded using brazing, diffusion bonding, laser welding, resistance welding or ultrasonic consolidation using indirect 3D printing. DED employs a laser engineered net shaping method that is used for metal 3D printing. Thus it is to be appreciated that in one embodiment subject combustion devices can be suitably prepared or manufactured by additive manufacturing such as involving repetitively depositing layer-upon-layer of material, sintering or consolidating bound powder material, or metallurgically bonding metal sheets using brazing, diffusion bonding, laser welding, resistance welding or ultrasonic consolidation, for example.

It is also well-known in the art of atmospheric gas burners that the primary air oxidant can be drawn into the burner by the motive force created by gas entering an orifice opening, such as the fluid ejector principle shown in FIG. 1. The injection of gas creates a negative pressure relative to the surrounding ambient pressure, which causes atmospheric air to be drawn through the air valve and into the burner. The orifice diameter controls the gas flow rate. The internal design and length of the mixing tube allow for proper combination so that a homogeneous gas/air mixture can be delivered to the burner head prior to being ejected through the burner ports. Internal burner roughness will affect the amount of primary air injected due to frictional losses. It is possible to increase primary air by enlarging the burner ports and thereby reducing individual port loading, but when this is done, care must be taken that no flashback results.

In accordance with one embodiment, the fluid ejector principle is used in methods and devices to both create the motive force and to aspirate the fuel in the oxidant. In this embodiment, the motive force can be provided by the fuel itself rather than through an external source. Such methods and devices improve over existing atmospheric burner designs and processes that use the fluid ejector principle because the plurality of ports provides more distributed mixing and uniformity compared to a single port or few ports. In addition, the subject development incorporates individual secondary conduits to distribute and more uniformly entrain the recirculated mixed products to each burner in order to reduce emissions. The subject development, by permitting employment of multiple burners and allowing burners to be oriented in many ways and positions, allows designers of burner assemblies much more flexibility to better control the amount of secondary air entrained, as compared to single burner designs.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Figure 9:
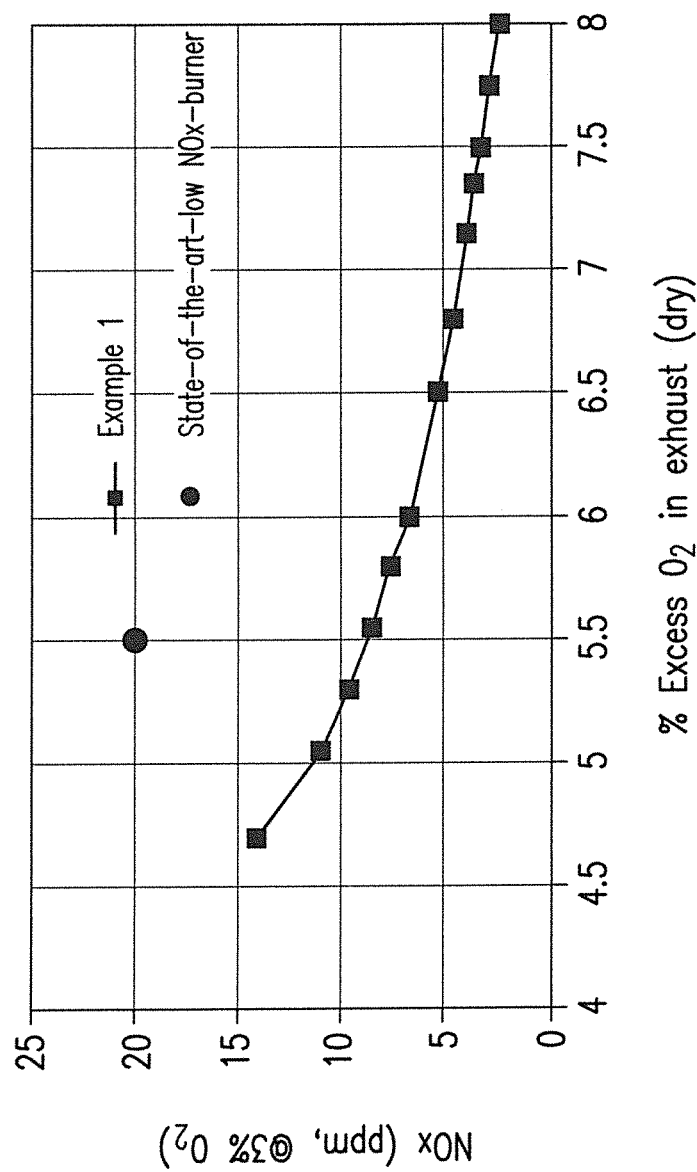
FIG. 9 is a graphical presentation of NOx emissions realized in the burner testing performed with variable excess air levels in Example 1 using a burner device in accordance with one preferred embodiment of the subject development as compared to a state-of-the-art burner that was tested in a commercial burner environment.

FIG. 9 is a graphical presentation of NOx emissions realized in burner testing performed with variable excess air levels in Example 1 using a burner device in accordance with one preferred embodiment of the subject development as compared to a state-of-the-art burner that was tested in a commercial burner environment.

In this testing of a burner device in accordance with the subject development, a burner device similar to that shown in FIG. 3 and wherein recirculated products are recirculated through the secondary conduits was employed. Testing for the subject burner device was performed on a laboratory bench with air and pipeline natural gas that were monitored with mass flow controllers. A non-reactive quartz tube was placed above the flame zone and emissions measurements were taken 16 inches above the burner exit plane. NOx emissions were measured using a calibrated HORIBA PG-250 emissions analyzer.

The state-of-the-art burner shown was a steel cylindrical premix burner design that was tested in the commercial water heater burner environment with the controls for the water heater.

As identified above, the testing of the subject burner device was performed with variable excess air levels. However, the thermal NOx emissions are also a function of flame temperature and hence are compared in the current case.

As shown by FIG. 9, the subject burner device provides or results in a dramatic reduction in NOx emissions as compared to the state-of-the-art low NOx burner.

While in the foregoing specification the subject development has been described in relation to certain preferred embodiments thereof, and many details have been set forth for purpose of illustration, it will be apparent to those skilled in the art that the invention is susceptible to additional embodiments and that certain details described herein can be varied considerably without departing from the basic principles of the invention.

What is claimed is:

1. A method for reducing NOx formation upon combusting oxidant with fuel to form products of combustion, the method comprising:
    mixing at least two fluids selected from a group consisting of oxidant, fuel and recirculated products of combustion in at least one first conduit to form a first mixture;
    supplying the first mixture to a plurality of second conduits each in direct fluid communication with the at least one first conduit;
    aspirating via motive energy created by action of the first mixture, one or more fluids selected from a second group consisting of oxidant, fuel and recirculated products of combustion in at least one of the plurality of second conduits to mix with the first mixture and form a combustible mixture; and
    burning the combustible mixture to form products of combustion; and
    recirculating a portion of the products of combustion as the recirculated products of combustion to the mixing in the at least one first conduit or the aspirating in the at least one of the plurality of second conduits.

2. The method of claim 1 wherein said aspirating step comprises passing the first mixture through a converging-diverging conduit.

3. The method of claim 1 wherein the mixing step comprises aspirating, via motive energy in a first of the at least two selected fluids, a second of the at least two selected fluids to form the first mixture.

4. The method of claim 3 wherein the aspirating, via motive energy to form the first mixture comprises passing the at least two fluids selected from the first group through a first converging-diverging conduit and wherein the aspirating via motive energy to form the combustible mixture comprises passing the first mixture through a second converging-diverging conduit.

5. The method of claim 1 wherein at least one of the at least two fluids of the first mixture and the one or more fluids of the second group comprises oxidant and the oxidant comprises air.

6. The method of claim 1 wherein at least one of the at least two fluids of the first mixture and the one or more fluids of the second group comprises oxidant and the oxidant is preheated.

7. The method of claim 1 wherein at least one of the at least two fluids of the first mixture and the one or more fluids of the second group comprises fuel and the fuel comprises natural gas.

8. The method of claim 1 wherein at least one of the at least two fluids of the first mixture and the one or more fluids of the second group comprises fuel and the fuel is preheated.

9. The method of claim 1 wherein the at least one second conduit is nonlinearly disposed relative to the at least one first conduit.

10. The method of claim 1 wherein the at least one of the plurality of second conduits is internally coated with a catalyst.

11. The method of claim 1 wherein the at least one second conduit comprises a flow path adjacent surface that is rough or non-uniform.

12. A combustion device comprising:
a burner for combusting oxidant with fuel to form products of combustion, the burner having at least one inlet and at least one outlet;
at least one first conduit wherein at least two fluids selected from a first group consisting of oxidant, fuel and recirculated products of combustion are mixed to form a first mixture; and
a plurality of second conduits each in direct fluid communication with the at least one first conduit and wherein motive energy, created by action of the first mixture, aspirates one or more fluids selected from a second group consisting of oxidant, fuel and recirculated products of combustion to form a combustible mixture, the plurality of second conduits in fluid discharge communication with the burner;
wherein at least one of the at least two fluids mixed in the first conduit or of the one or more fluids of the second group aspirated into the second conduit is the recirculated products of combustion.

13. The combustion device of claim 12 wherein one or more of the plurality of second conduits comprises a converging-diverging conduit aspirating mixer.

14. The combustion device of claim 12 wherein the at least one first conduit comprises an aspirating mixer.

15. The combustion device of claim 12 wherein at least one of the plurality of second conduits is nonlinearly disposed relative to the at least one first conduit.

16. The combustion device of claim 12 wherein at least one of the plurality of second conduits is disposed at a nonlinear angle relative to the at least one first conduit.

17. The combustion device of claim 12 manufactured by additive manufacture technique.

18. The combustion device of claim 12 wherein the plurality of second conduits comprises at least three second conduits.

19. The combustion device of claim 12 additionally comprising a screen mesh downstream of and proximate to the plurality of second conduits.

20. The combustion device of claim 19 wherein the screen mesh includes a catalyst.

21. The method of claim 1 wherein the motive energy is present in the first mixture.

22. The method of claim 1 wherein the recirculated products of combustion comprises products of partial combustion aspirated upstream of a formed combustion exhaust.

* * * * *